(12) United States Patent
Delbet et al.

(10) Patent No.: US 7,338,269 B2
(45) Date of Patent: Mar. 4, 2008

(54) TIRE TREAD MOLD

(75) Inventors: Cédric Delbet, Chamalieres (FR);
Jean-Claude Desvignes, Gerzat (FR);
Robert W. Knepfle, Piedmont, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/542,236

(22) Filed: Oct. 4, 2006

(65) Prior Publication Data

US 2007/0077320 A1    Apr. 5, 2007

Related U.S. Application Data

(60) Provisional application No. 60/741,081, filed on Dec. 1, 2005.

(30) Foreign Application Priority Data

Oct. 4, 2005    (FR) .................................. 05 10115

(51) Int. Cl.
*B29C 35/02* (2006.01)
(52) U.S. Cl. .......................................... 425/37; 425/46
(58) Field of Classification Search ............... 425/28.1, 425/37, 46
See application file for complete search history.

(56) References Cited

U.S. PATENT DOCUMENTS 1,733,064 A    10/1929    Lambert
4,968,237 A    11/1990    Persson
6,143,223 A    11/2000    Merino Lopez
6,408,910 B1 *    6/2002    Lagnier et al. ............... 425/37
6,461,135 B1 *    10/2002    Lagnier et al. ............... 425/46
6,767,495 B2    7/2004    Aperce et al.

FOREIGN PATENT DOCUMENTS

| EP | 0 858 875 | 8/1998 |
| EP | 1 275 527 | 1/2003 |
| JP | 59-192541 | 10/1984 |
| JP | 04-244815 | 9/1992 |

* cited by examiner

*Primary Examiner*—James P. Mackey
(74) *Attorney, Agent, or Firm*—Buchanan Ingersoll & Rooney PC (57) ABSTRACT

A mold for molding a tread of rubber mix, this tread comprising a running surface delimited axially by lateral faces, this mold comprising (i) a central part for molding the running surface, movable between an open configuration allowing filling of the mold and a closed configuration allowing molding, the central part comprising at least one rib for molding a groove in the running surface; (ii) two lateral parts for molding the lateral faces, at least one of the lateral parts being axially movable relative to the central part; et (iii) at least one pin for molding a channel inside the tread, this pin being anchored in one of the lateral parts; and in which, when the mold is closed, a contact surface is formed between the pin and the rib, and the pin and/or the rib comprise a buffer made of a deformable material, deformation of which makes it possible to fill in the clearance between the pin and the rib at the contact surface when the mold is closed.

16 Claims, 7 Drawing Sheets

TIRE TREAD MOLD

The present application claims priority under 35 U.S.C. §§119 and/or §365 to patent application Ser. No. 05/10115 filed in France on Oct. 4, 2005, and U.S. Provisional Application Ser. No. 60/741,081 filed on Dec. 1, 2005.

BACKGROUND OF THE INVENTION

Field of the Invention

The present invention relates to molds allowing the molding of tires or of treads.

DEFINITIONS

In the present document, the terms "axial" and "axially" designate a direction substantially parallel to the axis of rotation of a tire, or, if these terms are applied to a tread which has not as yet been fixed to a tire, a direction intended to be substantially parallel to the axis of rotation of a tire once the tread is fixed to the tire. A point of a tread is said to be axially to the outside of a second point of the same tread if the first point is axially further from the median plane of the tread.

The terms "radial" and "radially" here designate any direction perpendicular to the axis of rotation of the tire and intersecting this axis, or, if these terms are applied to a tread which has not as yet been fixed to a tire, any direction intended to be perpendicular to the axis of rotation of the tire and intersecting this axis once the tread is fixed to the tire.

The terms "circumferential" and "circumferentially" refer to a direction which is perpendicular both to the axial and radial directions.

The terms "axial", "radial" and "circumferential" apply to the molds by analogy with the tires or treads molded using these molds.

The "running surface" of a tire tread means the surface formed by the points of the tread which enter into contact with the ground when the tire is rolling.

The "lateral face" of a tread of a tire means any part of the surface of the tread which extends from the axial ends of the running surface to the sidewalls of the tire. When considering a tread before it is fixed to a tire, a lateral face consists of the part of the surface of the tread which connects one of the edges of the running surface to the surface intended to come into contact with the carcass of the tire.

The term "pin" means any molding element intended to mold a cavity of which at least a part is situated radially inside the running surface of the tread and which opens onto at least one lateral face of the tread, without further geometric limitations.

"Mean direction of the pin" denotes the direction in which the pin exhibits its largest dimension. "Mean section of the pin" means the average of the sections of the pin in planes perpendicular to the mean direction of the pin.

"Channel" means a cavity molded by a pin.

"Mix" or "rubber mix" means a rubber composition comprising at least an elastomer and a filler.

The term "tire" here designates any type of elastic casing, which may or may not be inflated and may or may not be subject when in service to an internal pressure.

RELATED ART

It has long been known that the presence of channels situated beneath the running surface of a tire and opening onto a lateral face of the tread may impart useful properties to the tire, in particular when it comprises a thick tread. The channels make the tread pattern evolutional, as they appear at the surface of the tread as it wears, so promoting grip on wet ground without for all that sacrificing the rigidity of the tread when new. Moreover, the channels contribute to cooling of the shoulders of the tire (ventilation effect) and consequently improve its endurance. These hydrodynamic and thermal effects are amplified when the channel opens not only onto a lateral face of the tread, but also into a groove of the tread.

U.S. Pat. No. 6,767,495 (corresponding to EP 1 232 852) describes a mold and a molding process for a tread comprising this type of channel. The mold comprises radially movable crown sectors comprising ribs intended to mold tire grooves, and radially and axially movable shoulder sectors, of which at least some bear pins intended for molding the axial channels. In a preferred embodiment, these pins rest, during penetration of the pins into the mix forming the tread, on the ribs, in order to withstand the pressure exerted by the mix to be molded.

This molding process has proven effective; when used, however, it has been noted that a film of mix may form in random manner between the surface of the pin and the rib on which this same pin rests. Formation of this film is encouraged by the strong molding pressures (of the order of 10 bar), which amplify creep of the mix into the space resulting from the clearance between pin and rib. The dimensions of the film result, inter alia, from the tolerances with which the mold parts are made, from the thermal conditions and conditions of use and from wear of the mold parts. In the mold described in U.S. Pat. No. 6,767,495, the film is not necessarily broken on axial withdrawal of the pin, nor on radial withdrawal of the crown sector. If the film remains in whole or in part, the orifice connecting the channel to the groove closes up. In use, this closing up reduces or blocks liquid or gas flow between the channel and the groove; consequently, the contribution of the channel to water evacuation and to lowering of the operating temperature of the parts of the tire surrounding it, and in particular of the shoulders of the tire, is reduced or even inexistent.

The same phenomenon has been observed in other molds. U.S. Pat. No. 6,143,223 describes a mold with pins for molding part of a tire tread, this mold comprising at least one molding element intended to mold a groove in the tread, two of the main walls of the groove being provided with at least one connecting element joining these walls. The molding element consists of a first and a second part: the first part constitutes the support, the second part comprises at least one pin intended to be assembled with the first part so as to form at least one orifice for molding the connecting elements joining the main walls of the groove. The clearance necessary for positioning the pins in the support results in the formation of films of mix. Since only some of the films are broken at the moment of disengagement of the pins, it is proposed to provide, in each pin passage, and on each pin, threads enabling each pin to be introduced by screwing. This arrangement makes it possible to reduce substantially the quantity of mix which is able to enter each passage. Moreover, the rotational movement imposed on each pin to unscrew it has the effect of shearing and thus breaking the films formed between each pin and the pin passages. One disadvantage of this solution consists in the fact that it requires means for screwing in and unscrewing each pin, so rendering molding and unmolding very complex. Another drawback of the solution lies in the fact that it creates constraints with regard to the geometry of each pin, because the threaded zones are necessarily cylindrical.

Patent EP 1 275 527 also mentions the formation of films of mix between two molding elements prior to vulcanization and proposes equipping the ends of the molding elements with sharp blades allowing these small quantities of mix to be separated from the tread at the very moment they are formed.

SUMMARY OF THE INVENTION

One object of the invention is to obtain a channel situated radially beneath the surface of a tire tread and opening both onto a lateral face of the tread and onto at least one lateral wall of at least one groove of the tread without being closed up by a film of mix. This objective is achieved by a mold for molding a tread of rubber mix, this tread comprising a running surface delimited axially by lateral faces, this mold comprising:

- a central part for molding the running surface, movable between an open configuration allowing filling of the mold and a closed configuration allowing molding, the central part comprising at least one rib for molding a groove in the running surface;
- two lateral parts for molding the lateral faces, at least one of the lateral parts being axially movable relative to the central part; and
- at least one pin for molding a channel inside the tread, this pin being anchored in one of the lateral parts;

and in which, when the mold is closed, a contact surface is formed between the pin and the rib and the pin and/or the rib comprise at least one buffer made of a deformable material, deformation of which makes it possible to fill in the clearance between the pin and the rib at the contact surface when the mold is closed.

The presence of the buffer has the advantage of preventing any air from being enclosed between the pin and the rib. Generally speaking, fixing the buffer on the rib (rather than on the pin) has the advantage that the buffer experiences less strain and friction when the pin is withdrawn from the molded tire, which increases its service life.

The expression "mold for molding a tread" should here be understood in a broad sense, encompassing a mold serving solely for molding the tread (for example, for manufacturing flat or round treads intended to be fixed to a new tire or for retreading) or of a mold allowing a tread to be formed directly on the tire (such as, for example a traditional tire mold).

In order that the channels may wholly fulfill their function, the pressure drop between each channel and the groove into which it opens must be minimized. In terms of molding, this means in particular that the contact surface between pin and rib must have adequate dimensions relative to the section of the channel.

Several geometric criteria may be formulated:

According to a first criterion, the ratio between (i) the area of the projection of the contact surface in a plane perpendicular to the mean direction of the pin and comprising the point of the contact surface axially furthest to the outside and (ii) the section of the pin in the same plane is preferably greater than 0.5 and even more preferably greater than 0.8.

According to a second criterion, the ratio between (i) the area of the projection of the contact surface in a plane perpendicular to a radial direction intersecting the contact surface and (ii) the section of the pin in a plane perpendicular to the mean direction of the pin and comprising the point of the contact surface axially furthest to the outside is preferably greater than 0.5 and even more preferably greater than 1.

According to a third criterion, the ratio between (i) the area of the projection of the contact surface in a plane perpendicular to the mean direction of the pin and comprising the point of the contact surface axially furthest to the outside and (ii) the mean section of the pin, measured perpendicularly to the mean direction of the pin, is preferably greater than 0.5 and even more preferably greater than 0.8.

According to a fourth criterion, the ratio between (i) the area of the projection of the contact surface in a plane perpendicular to a radial direction intersecting the contact surface and (ii) the mean section of the pin, measured perpendicularly to the mean direction of the pin, is preferably greater than 0.5 and even more preferably greater than 1.

The first and second criteria allow a relationship to be established between the area of the contact surface (in its projection in the direction of the pin and in its radial projection) and the section of the pin in the vicinity of the contact surface; the third and fourth criteria allow a relationship to be established between this same area of the contact surface and the mean diameter of the pin, which has the advantage of taking account of the mean dimension of the channel and thus of its capacity to conduct fluids. Of course, a pin according to the invention may satisfy several criteria at once.

According to a first preferred embodiment, the contact surface between the pin and the rib comprises a first part and a second part, the first part being substantially perpendicular to the radial direction and the second part being inclined with respect to the first part, and the buffer fills the clearance between the pin and the rib at said second part of the contact surface. The first and second parts are preferentially flat, as this allows a good contact between the pin and the rib. The angle of inclination $\alpha$ between the first part and the second part, measured in a plane comprising both the radial direction and the mean direction of the pin (see FIGS. 8 and 18) is preferentially greater than 45° and even more preferentially greater than 70°. This embodiment allows to reduce the strain experienced by the deformable buffer when the mold is closed. At that moment, the radial forces exerted upon the assembly formed by the pin and the corresponding rib are mainly taken up by the first part. The buffer that covers the second part, which is inclined with respect to the radial direction, undergoes little or no strain, which significantly increases its service life. This is true irrespective of whether the buffer is integral with the pin or with the rib.

According to a second preferred embodiment, the buffer is integral with the rib and has the shape of a strip, extending, for example, in a direction that is substantially perpendicular to the radial direction, such that it may serve as a support for a plurality of pins. This embodiment allows to reduce the manufacturing cost of the mold, in particular when a great number of pins is used. Moreover, as the buffer is fixed on the rib, there is more space and a thick buffer may be used, which allows to make up for more severe misalignment of pins.

According to a third preferred embodiment, the buffer comprises a deformable zone and a docking zone made of rigid material, preferably of metal, which is intended to come in contact with the pin. This makes it possible to avoid any direct contact between the pin and the deformable material, with the intention of reducing the friction suffered by the material, and, consequently, of increasing the buffer's service life. Preferentially, the buffer further comprises a rigid, preferably metallic, fixing zone for fixing the buffer on the rib, for example by means of a thread. In this embodiment, the deformable zone is sandwiched between the fixing zone and the docking zone.

The deformable buffer may be made of a plastic material (such as a metal foam) or an elastic material (such as for example silicone). According to a preferred embodiment, the deformable buffer is made of an elastic material, because this characteristic makes it possible to prevent the formation of any clearance between pin and rib even after a plurality of molding stages. If deformation is purely plastic, the buffer will not be in a position to ensure compensation of the clearance stemming from wear of the molding elements or due to assembly. It is thus advantageous to use materials whose deformation has an elastic component. Preferably, a material will be used which is both elastic and incompressible, such as silicone.

BRIEF DESCRIPTION OF THE DRAWINGS

The invention will be better understood from the description of the drawings, in which.

These Figures are given purely by way of illustration and are in no way limiting.

DETAILED DESCRIPTION OF THE INVENTION

Figure 1:
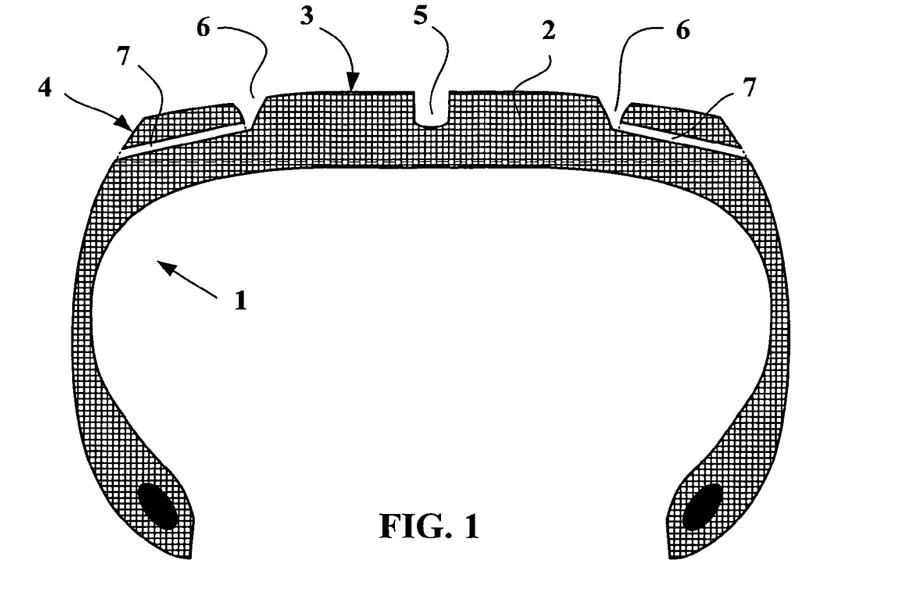
FIG. 1 is a schematic representation of a partial view of a tire in radial section.

FIG. 1 is a schematic representation of a partial view in radial section of a tire 1 provided with a tread 2 comprising a running surface 3 delimited axially by lateral faces 4. The tread has a central groove 5; other grooves 6 are also disposed over the section. These grooves 6 are connected to the lateral faces 4 by means of channels 7.

Figure 2:
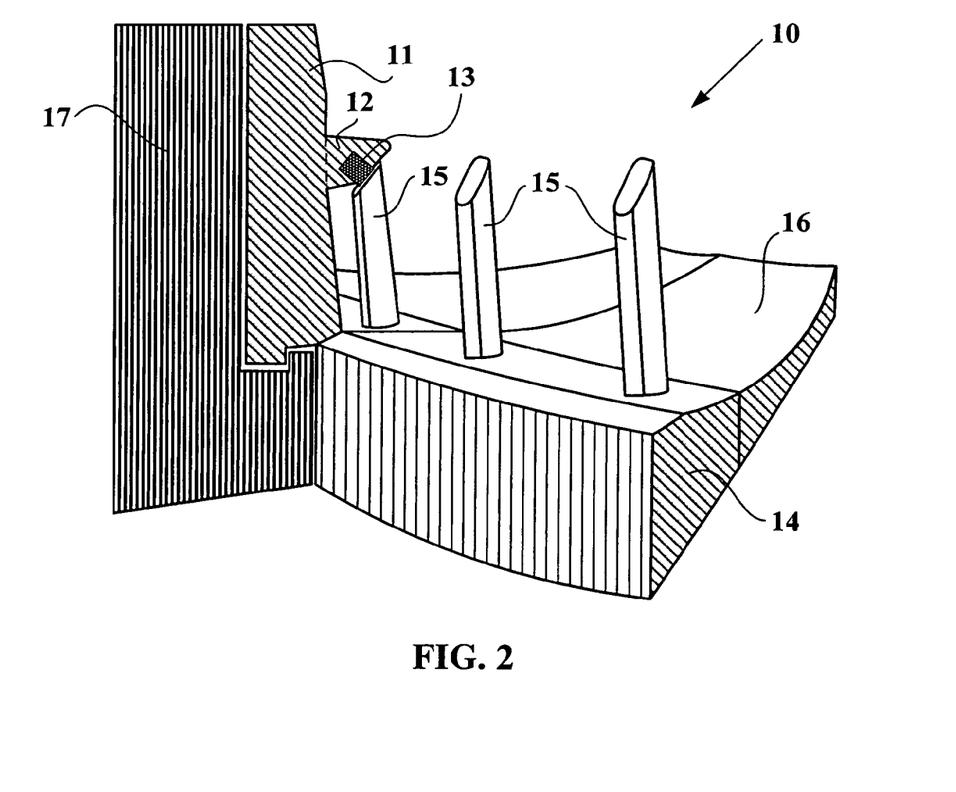
FIG. 2 is a schematic representation of a partial perspective view of a mold according to the invention.

FIG. 2 is a schematic representation of a partial perspective view of a mold 10 according to the invention allowing to obtain a tire 1 provided with channels 7 opening both onto a lateral face 4 of the tread 2 and onto at least one lateral wall of at least one groove 6 of the tread 2 without being closed up by a film of mix.

The Figure shows the central part 11 intended for molding the running surface 3 provided with a rib 12 comprising a deformable buffer 13. Also shown is a lateral part 14 intended for molding the lateral face 4 of the tread 2. The pins 15 are integral with this lateral part 14. FIG. 2 shows the mold 10 in its closed configuration; each of the pins 15 is in contact with a rib 12 (for the purpose of clarity, only one of these ribs is shown), via the buffer 13 made of a deformable material; the pressure exerted on the buffer 13 causes the latter to deform, which makes it possible to fill in the clearance between the pin 15 and the rib 12 at the contact surface. Consequently, the mix cannot enter the space between the pin 15 and the rib 12 during molding, which has the result of preventing the formation of a film partially or totally blocking the channel 7 (FIG. 1). For the purpose of clarity, a part of the shell 16 provided for molding the sidewalls of the tire 1 and one of the reinforcing parts 17 of the mold 10 are also shown.

It should be pointed out that contact between the pin and rib is not necessarily perfect, insofar as the surfaces in contact may exhibit bumps, provided that their size is sufficiently small not to allow the intrusion of mix between pin and rib (as a result of the surface tension of the mix). If, for example, a pin is used whose end is formed of a plurality of small spikes, the contact surface in the strict sense consists of a plurality of points. With regard to the geometric criteria mentioned above, consideration should then be given not to this contact surface in the strict sense but to the surface defined by the surface enveloping all the contact points. Preferably, however, surfaces will be used which are sufficiently flat to limit as much as possible the enclosure of air between pin and rib.

Figure 3:
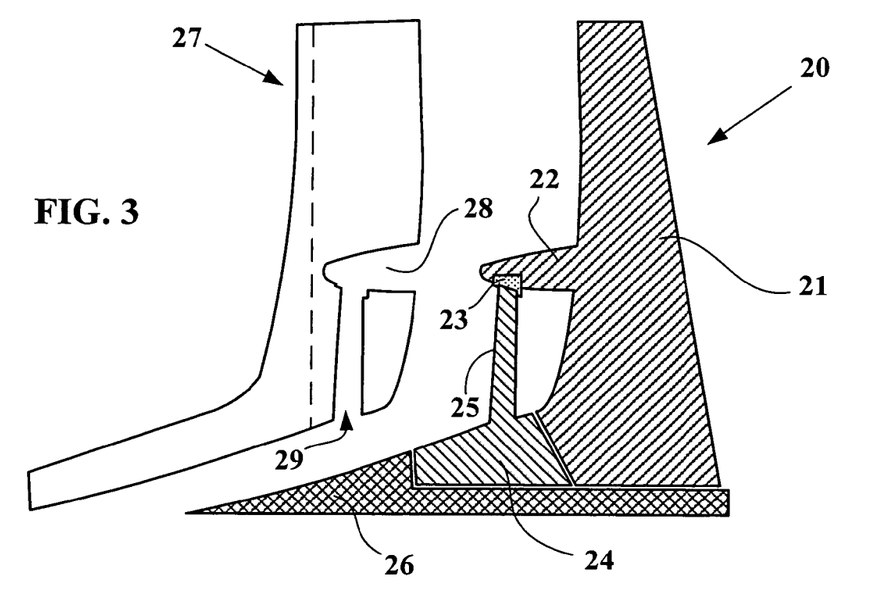
FIGS. 3 and 4 are schematic representations of a partial view in radial section of a mold according to the invention and of a tire after molding.

FIG. 3 is a schematic representation of a partial view in radial section of a mold 20 according to the invention and of a tire 27 molded using this mold 20. The mold 20 is similar to the mold 10 in that the rib 22 with which the central part 21 is provided comprises a buffer 23 made of a deformable material. The pin 25 which is integral with the lateral part 24 rests against the buffer 23 when the mold 20 is closed. Part of the shell 26 intended for molding the sidewall of the tire 27 is also shown. The transition zone between the channel 29 molded by the pin 25 and the groove 28 molded by the rib 22 is free of any film of mix; the mold 20 according to the invention makes it possible to prevent any risk of such a film forming and blocking the channel 29.

Figure 4:
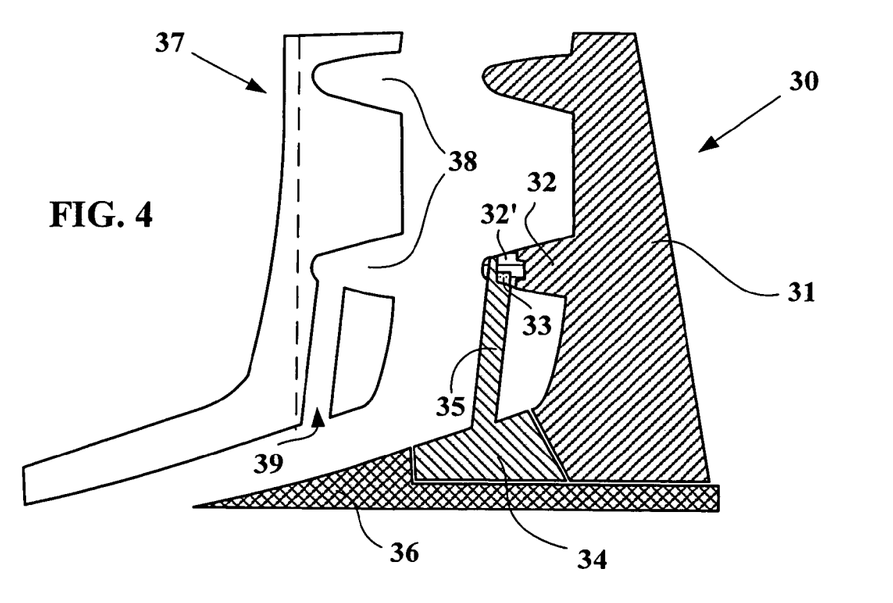

FIG. 4 is a schematic representation of a partial view in radial section of another mold 30 according to the invention. The central part 31 is distinguished from the central part 21 of the mold 20 in that it comprises two ribs intended for molding two distinct grooves 38 in the tread of the tire 37. The pin 35 which is integral with the lateral part 34 is inclined slightly relative to the axial direction, which has the effect that the channel 39 molded by the pin 35 is also inclined. Once again, the transition zone between the channel 39 and the groove 38 into which it opens is free of any film blocking the channel 39.

The structure of the ribs 22 and 32 is illustrated in more detail in FIGS. 5 to 8. In particular part 32' is shown in detail in FIG. 7.

Figure 5:
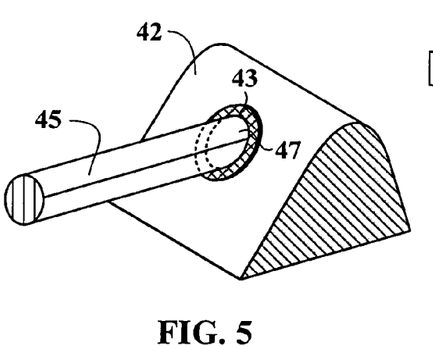
FIGS. 5 and 6 are schematic representations of a perspective and sectional view of the ends of a pin and of a rib of a mold according to the invention.

FIG. 5 shows a perspective view of a pin 45 and of a rib 42 of a mold according to the invention. The configuration shown corresponds to a closed mold; the pin 45 rests against the buffer 43 which the rib 42 comprises and thus crushes the buffer 43, which is deformable. In the example shown, the contact surface 47 between the pin 45 and the buffer 43 is smaller than the total surface which the buffer 43 exhibits.

Figure 6:
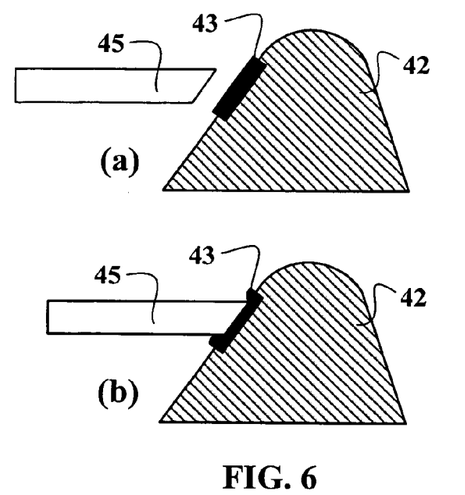

FIG. 6 shows the same configuration in section, before (FIG. 6(a)), and after (FIG. 6(b)) full closure of the mold. The Figures clearly show the deformation suffered by the buffer 43 when the pin 45 is set in place when the mold is closed.

Figure 7:
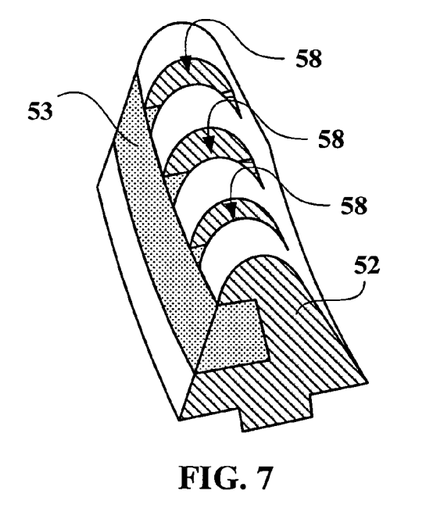
FIG. 7 is a schematic representation of a perspective view of the end of a rib of a mold according to the invention.

FIG. 7 is a schematic representation of a perspective view of the end of another rib 52 of a mold according to the invention. The part of the rib 52 illustrated may accommodate three pins, which position themselves in the notches 58 when the mold is closed. The buffer 53 takes the form of a single strip positioned continuously on the rib 52 and serving as a support for the three pins. The advantage of this embodiment consists in the fact that the deformable buffer 53 is continuous; as a result, it is not necessary to provide and position one buffer per pin. Given the considerable intrinsic bulk of a buffer such as that in FIG. 6, the embodiment corresponding to FIG. 7 is particularly suited to instances in which the channels 7 (FIG. 1) are very close to one another.

Figure 8:
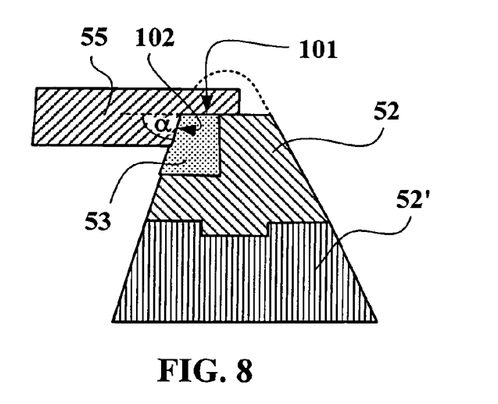
FIG. 8 is a schematic representation of a sectional view of the ends of a pin and a rib of a mold according to the invention.

FIG. 8 is a sectional view of the same configuration, suggesting how a pin 55 would be positioned on the rib when the mold is closed. It is also clear that the element 52 corresponds in reality only to the end of the rib, intended to be fitted on the base 52'. Separation of the elements 52 and 52' allows easy and quick replacement of the buffer 53, for example when it is worn or otherwise damaged (cuts etc.). The angle of inclination α between the first part 101 and the second part 102 of the contact surface between the pin 55 and the element 52 is equal to 80°.

Figure 9:
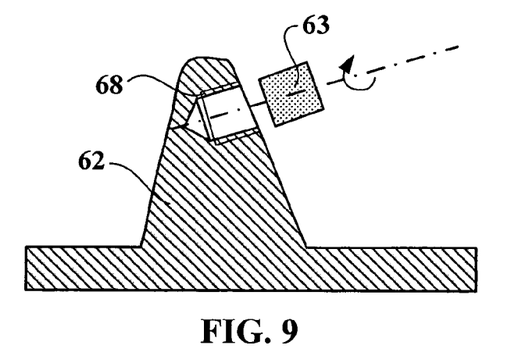
FIGS. 9 and 10 are schematic representations of an exploded sectional view of ribs of a mold according to the invention.

FIG. 9 is an exploded sectional view of a rib 62 of a mold according to the invention. This rib 62 is characterized in that the buffer 63 is screwed onto the rib by means of an internal screw thread 68 formed in the rib 62. For example, it is possible to screw a silicone cord, with a diameter adapted to the internal screw thread (typically between 6 and 12 mm) into said internal screw thread and to cut the cord leaving a slight excess thickness. This embodiment is distinguished by the great simplicity with which it may be implemented and by the fact that spare buffers may be manufactured at very low cost. Another advantage lies in the fact that it is possible to make unitary changes (buffer by buffer) without having to dismantle the mold.

Figure 10:
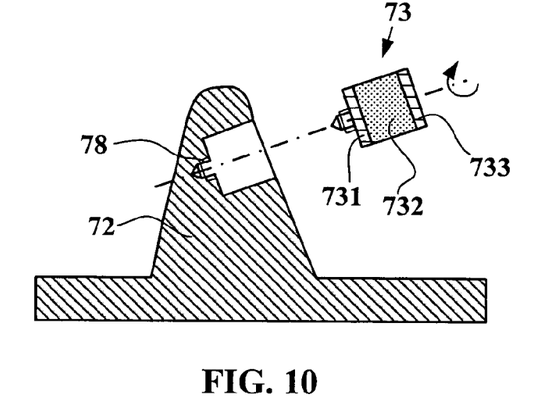

FIG. 10 is an exploded sectional view of another rib 78 of a mold according to the invention. Unlike the embodiment of FIG. 9, the buffer 73 includes a fixing zone 731 comprising a threaded pin, a deformable zone 732 and optionally a metallic docking zone 733 for receiving the end of the pin. It is fixed in the rib 72 by means of an internal screw thread 78, the diameter of which is of course smaller than the internal screw thread 68 of FIG. 9 (for example 3 mm instead of 10 mm). It is possible to provide a hollow hexagonal recess in the docking zone 733 so as to be able to screw the buffer 73 into the rib 72 by means of a key for hexagon socket screws. The advantage conferred by a metallic docking zone 733 lies in the perpetuation of the tight contact between the pin and the rib, given that certain buffer materials (e.g. silicone) do not resist very well to repeated friction.

Figure 11:
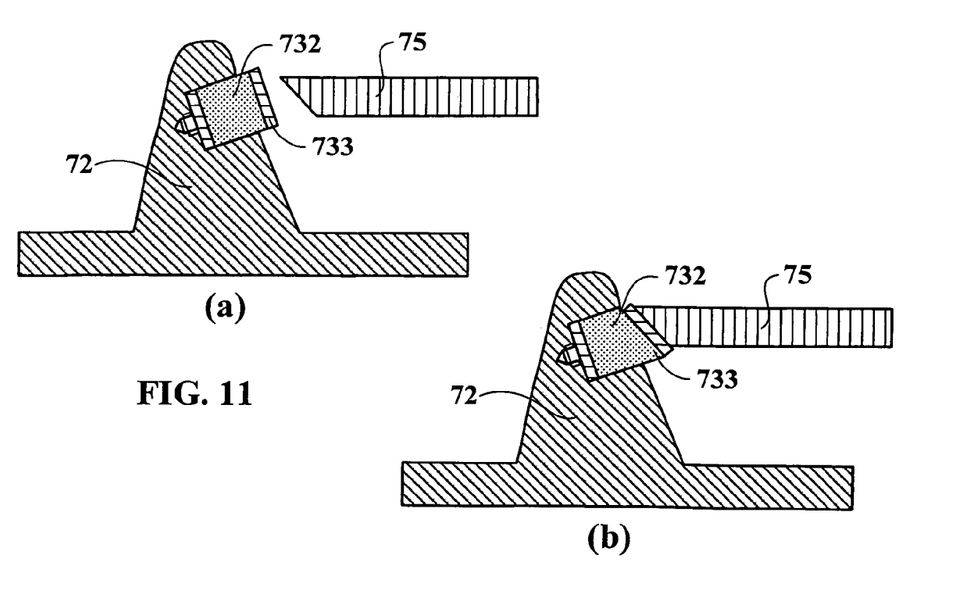
FIG. 11 is a schematic representation of a sectional view of the rib of FIG. 10 and of the end of a pin, before and after the pin and rib have been brought into contact.

FIG. 11 is a sectional view of the rib 72 of FIG. 10 after screwing-in of the buffer 73. FIG. 11(a) shows a situation where the mold has not yet been fully closed; the pin 75 has not yet entered into contact with the buffer 73 of the rib 72. In FIG. 11(b), the mold is closed and the pin 75 is in contact with the docking zone 733 of the buffer 73. Under the pressure exerted by the pin 75, the deformable zone 732 deforms in such a way that the docking zone 733 comes into alignment with the surface presented thereto by the pin 75, which allows tight contact and prevents the formation of a film of mix between the pin 75 and the buffer 73.

All the embodiments shown in FIGS. 1 to 11 correspond to solutions to the technical problem in which the rib comprises a deformable buffer. It is also possible to connect the deformable part not with the rib but with the end of the pins, as illustrated in FIGS. 13 to 15.

Figure 12:
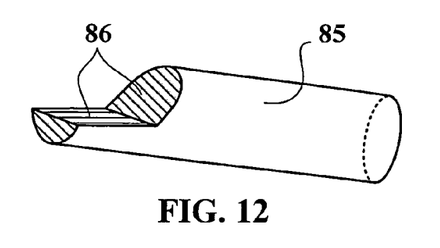
FIGS. 12 and 13 are schematic representations of a perspective view of the end of a pin with and without a deformable buffer.

FIG. 12 shows a perspective view of the end of a pin 85 adapted for use with a rib like the rib 52 of FIG. 7. The surfaces 86 intended to come into contact with the rib are made of the rigid material of the pin 85, in this instance of steel; it is of course possible to use other rigid materials, such as certain steel alloys.

Figure 13:
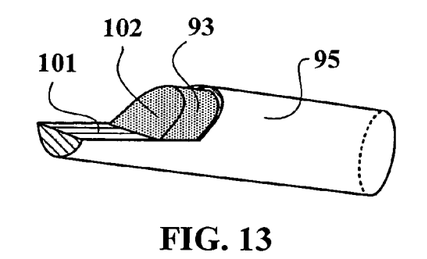

FIG. 13 shows a pin 95 geometrically similar to pin 85, but provided with a deformable buffer 93. This pin 95 may thus be used with a rib which lacks a deformable zone. A part 101 of the contact surface between the pin 95 and the corresponding rib is not covered with deformable material, which allows it to take up the forces exerted in the direction perpendicular to this part 101 (thus substantially radial) and to prevent the buffer 93 and the body of the pin from undergoing excessive elastic deformation, which would increase the risk of damage. Here the angle of inclination α between the first part 101 and the second part 102 of the contact surface between the pin 95 and the rib (not shown) is equal to 60°.

Figure 14:
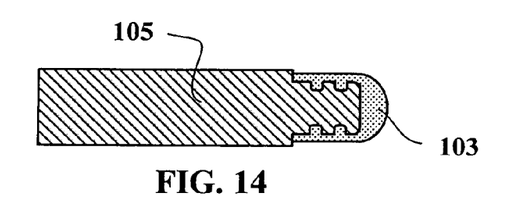
FIGS. 14 and 15 are schematic representations of a sectional view of the end of a pin provided with a deformable zone.
Figure 15:
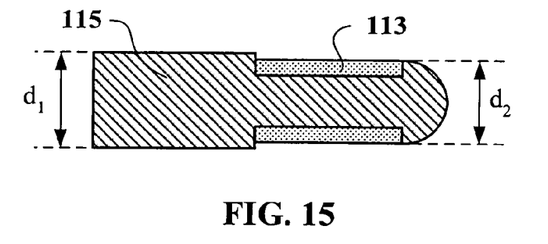

FIG. 14 shows another type of pin 105 comprising the buffer zone 103 at its end. Use of such a pin may be advantageous, in particular when a reduction of the bulk volume is sought. With this type of pin, the buffer 103 ensures contact surface tightness and takes up the forces. The zone of the rib in which the pin is accommodated is flexible in form, but there is not generally a deformable buffer at the level of the rib.

FIG. 15 shows another pin 115 according to the invention, comprising a buffer zone 113. This variant consists in positioning a deformable tube 113, for example of elastomer, around the metal part of the pin 115. Thus entubed, the pin 115 (which is therefore a composite pin) is able to deform sufficiently to ensure tight contact between the pin 115 and the corresponding rib once the mold is closed and docking has been effected. The diameter $d_2$ of the tube 113 should be less than the diameter $d_1$ of the pin 115, so as to prevent untimely "detubing" on withdrawal of the pin during unmolding of the tire or of the tread (on the occasion of backward motion and/or tipping of the central part relative to the lateral part; cf the kinematics described in document EP 1 232 852).

Figure 16:
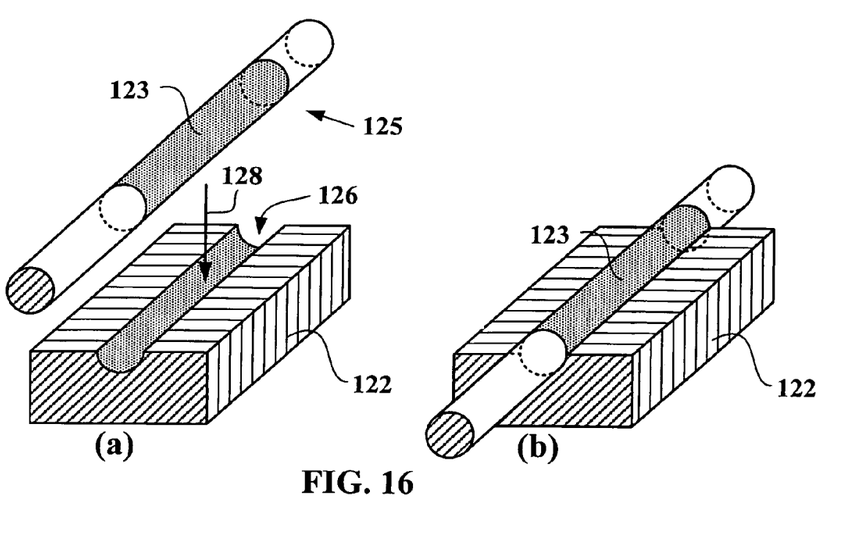
FIG. 16 is a schematic representation of a pin provided with a deformable zone and part of the element molding a groove against which the pin rests.

FIG. 16 shows a pin 125 of the same type as the pin 115 of the preceding Figure and part of the rib 122 with which the pin 125 is in contact when the mold is closed. FIG. 16(a) shows the pin 125 and the rib 122 before closure of the mold; when the mold is closed, the pin 125 and the rib 122 move towards one another in the direction indicated by arrow 128 until the pin positions itself in the recess 126 provided on the rib 122 (FIG. 16(*b*)). The deformable buffer 123 is so dimensioned as to cover the entire contact surface between the pin 125 and the rib 122. In this way, deformation of the buffer 123 makes it possible to prevent air from infiltrating and rubber mix from intruding between the pin 125 and the rib 122.

Figure 17:
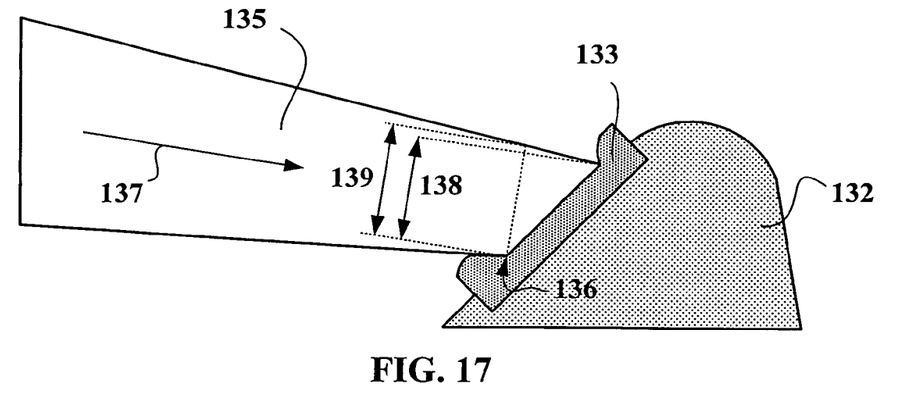
FIGS. 17 and 18 are schematic representations of a sectional view of the ends of a pin and of a rib of a mold according to the invention.
Figure 18:
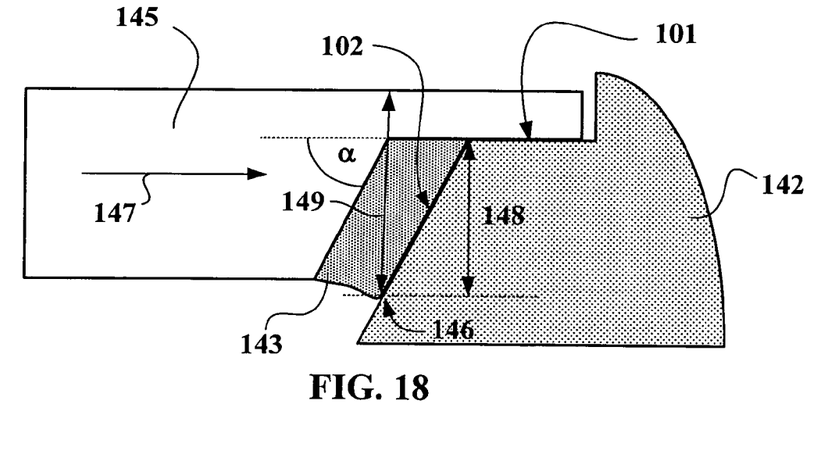

FIGS. 17 and 18 serve to illustrate the first geometric criterion applicable to the design of a mold according to the invention. FIG. 17 shows a rib 132 comprising a buffer 133 against which a pin 135 of conical geometry exerts pressure. The mean direction 137 of the pin is indicated by an arrow. The length of the trace of the projection of the contact surface between the pin 135 and the rib 132 comprising the buffer 133 in a plane perpendicular to the mean direction 137 of the pin and comprising the point of the contact surface axially furthest to the outside 136 is indicated by the double-headed arrow 138. The length of the trace of the section of the pin 135 in the same plane is indicated by the double-headed arrow 139. In this instance, the ratio between (i) the area of the projection of the contact surface between the pin 135 and the rib 132 in a plane perpendicular to the mean direction 137 of the pin and comprising the point of the contact surface axially furthest to the outside 136 and (ii) the section of the pin 135 in the same plane is equal to 0.9.

This Figure shows very well that for this type of pin, the ratio is other than 1 solely because the pin is conical to a certain degree: if the pin were cylindrical, the area of the projection of the contact surface between the pin and the rib in a plane perpendicular to the mean direction of the pin and comprising the point of the contact surface axially furthest to the outside and the section of the pin 135 in the same plane would coincide.

FIG. 18 shows a rib 142 against which a pin 145 (of the same type as the pin 95 of FIG. 13) exerts pressure. The pin 145 comprises a buffer 143 whose deformation is visible. The mean direction 147 of the pin is indicated by an arrow. The length of the trace of the projection of the contact surface between the pin 145 and the rib 142 in a plane perpendicular to the mean direction 147 of the pin and comprising the point of the contact surface axially furthest to the outside 146 is indicated by the double-headed arrow 148. The length of the trace of the section of the pin 145 in the same plane is indicated by the double-headed arrow 149. In this instance, the ratio between (i) the area of the projection of the contact surface between the pin 145 and the rib 142 in a plane perpendicular to the mean direction 147 of the pin and comprising the point of the contact surface axially furthest to the outside 146 and (ii) the section of the pin 145 in the same plane is equal to 0.75. Here the angle of inclination $\alpha$ between the first part 101 and the second part 102 of the contact surface between the pin 145 and the rib 142 is equal to 70°.

Figures 19, 20:
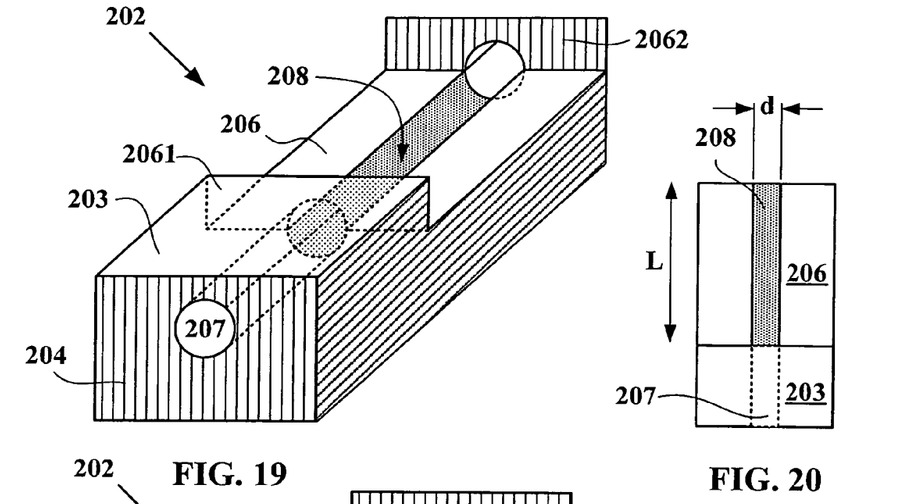
FIGS. 19 to 21 are schematic representations of part of a tread comprising a channel opening into a groove.
Figures 21, 22:
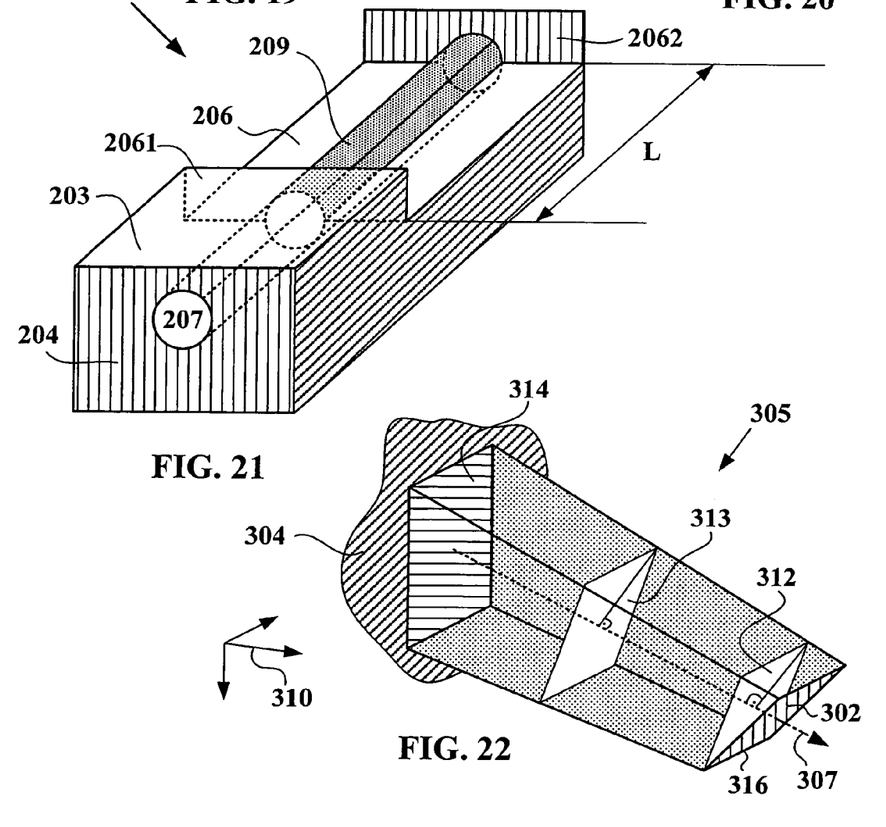
FIG. 22 is a schematic illustration of the third geometric criterion to be applied in designing a mold according to the invention.

FIGS. 19 to 21 are schematic representations of part of a tread comprising a channel opening into a groove; they serve in particular to illustrate the second geometric criterion applicable to the design of a mold according to the invention.

FIG. 19 is a schematic representation of part of a tread 202 obtained after molding with a pin and a rib as illustrated in FIG. 16. It shows a groove 206 defined by walls 2061 and 2062 and a channel 207 formed beneath the running surface 203, between a lateral face 204 of the tread 202 and the groove 206. In the example shown, which is in no way limiting, the channel extends even beyond the groove 206. As the pin used extends beyond the corresponding rib in the radial direction (see FIG. 16(*b*)), the groove 206 comprises a recess 208.

FIG. 20 shows the same part of a tread 202 in a projection into a plane perpendicular to a radial direction intersecting the contact surface.

The example shown corresponds to the result obtained with a cylindrical pin of a diameter "d" of 10 mm; the plane perpendicular to the mean direction of the pin (or, which is the same, of the channel 207) and comprising the point of the contact surface between the pin and the rib which is situated axially furthest to the outside coincides here with the plane comprising the wall 2061; the section of the pin in this plane is thus equal to $(d/2)^2\pi=78.5$ mm². If the width "L" of the groove (see FIG. 21) is also 10 mm, the area of the projection of the contact surface between the pin and the rib in a plane perpendicular to a radial direction intersecting the contact surface is substantially equal to d*L=100 mm². The ratio between (i) the area of the projection of the contact surface in a plane perpendicular to a radial direction intersecting the contact surface and the section of the pin in a plane perpendicular to the mean direction of the pin and comprising the point of the contact surface axially furthest to the outside is here equal to 1.27. It should be pointed out that the same ratio would be obtained by applying the fourth geometric criterion, since the section of the pin is constant and equal to $(d/2)^2\pi=78.5$ mm².

FIG. 21 is a schematic representation of part of a tread 202 obtained after molding with a pin and a rib as illustrated in FIG. 16, but without deformable buffer. Since a certain quantity of mix has infiltrated into the clearance between the pin and the rib, a film of mix 209 has formed, thus obstructing passage between the channel 207 and the groove 206. In the extreme case illustrated here, obstruction is total, because there was no direct contact between the pin and the rib. In real situations, the contact surface between a non-deformable pin and a non-deformable rib is not generally nil, but small relative to the section of the pin. Fitting the pin (or the rib) with a deformable buffer according to the invention thus makes it possible significantly to increase the contact surface and thus to minimize obstruction of the channel connecting the lateral face of the tread and a groove in the running surface.

FIG. 22 is a schematic illustration of the third geometric criterion applicable to the design of a mold according to the invention. It shows a perspective view of the configuration encountered in the case of a pin 305 of rectangular section which is inclined relative to the axial direction (corresponding to the axis 310). The lateral part of the mold is indicated by reference numeral 304, its intersection with the pin by reference numeral 314 and the contact surface between the pin 305 and the rib (not shown) by reference numeral 302. The mean section 313 of the pin 305, measured perpendicularly to the mean direction 307 of the pin 305, is shown at the point where the section of the pin 305 corresponds to the mean section. In the individual case shown, the ratio between (i) the area of the projection 312 of the contact surface 302 between the pin 305 and the rib in a plane perpendicular to the mean direction 307 of the pin 305 and comprising the point of the contact surface axially furthest to the outside (here: all the points of the line 316, which corresponds to the lower edge of the contact surface 302) and (ii) the mean section 313 of the pin 305, measured perpendicularly to the mean direction 307 of the pin 305, is equal to 0.6.

What is claimed is:

1. A mold for molding a tread of rubber mix, this tread comprising a running surface delimited axially by lateral faces, this mold comprising:
- a central part for molding the running surface, movable between an open configuration allowing filling of the mold and a closed configuration allowing molding, the central part comprising at least one rib for molding a groove in the running surface;
- two lateral parts for molding the lateral faces, at least one of the lateral parts being axially movable relative to the central part; and
- at least one pin for molding a channel inside the tread, this pin being anchored in one of the lateral parts;
- and in which, when the mold is closed, a contact surface is formed between the pin and the rib and the pin and/or the rib comprise at least one buffer made of a deformable material, deformation of which makes it possible to fill in the clearance between the pin and the rib at the contact surface when the mold is closed.

2. The mold of claim 1, wherein said contact surface comprises a first part and a second part, the first part being substantially perpendicular to the radial direction and the second part being inclined with respect to the first part, and wherein the buffer fills the clearance between the pin and the rib in said second part of the contact surface.

3. The mold of claim 2, wherein the buffer is integral with the pin.

4. The mold of claim 2, wherein the buffer is integral with the rib.

5. The mold of claim 4, wherein the buffer has the shape of a strip serving as a support for a plurality of pins.

6. The mold of claim 5, wherein the strip extends in a direction that is substantially perpendicular to the radial direction.

7. The mold of claim 1, wherein the buffer comprises a deformable zone and a docking zone which is intended to come in contact with the pin and which is made of rigid material.

8. The mold of claim 7, wherein the buffer further comprises a fixing zone for fixing the buffer on the rib.

9. The mold of claim 1, wherein said buffer is made of a elastic, incompressible material.

10. The mold of claim 9, wherein said buffer is made of silicone.

11. The mold of claim 1, wherein a first ratio between (i) the area of the projection of the contact surface in a plane perpendicular to the mean direction of the pin and comprising the point of the contact surface axially furthest to the outside and (ii) the section of the pin in the same plane is greater than 0.5.

12. The mold of claim 11, wherein said first ratio is greater than 0.8.

13. The mold of claim 1, wherein a second ratio between (i) the area of the projection of the contact surface in a plane perpendicular to a radial direction intersecting the contact surface and (ii) the section of the pin in a plane perpendicular to the mean direction of the pin and comprising the point of the contact surface axially furthest to the outside is greater than 0.5.

14. The mold of claim 13, wherein said second ratio is greater than 1.

15. The mold of claim 1, wherein a third ratio between (i) the area of the projection of the contact surface in a plane perpendicular to the mean direction of the pin and comprising the point of the contact surface axially furthest to the outside and (ii) the mean section of the pin, measured perpendicularly to the mean direction of the pin, is greater than 0.5.

16. The mold of claim 1, wherein a fourth ratio between (i) the area of the projection of the contact surface in a plane perpendicular to a radial direction intersecting the contact surface and (ii) the mean section of the pin, measured perpendicularly to the mean direction of the pin, is greater than 0.5.

* * * * *